United States Patent
Alavoine et al.

(10) Patent No.: US 10,761,774 B2
(45) Date of Patent: Sep. 1, 2020

(54) FORCED IDLING OF MEMORY SUBSYSTEMS

(71) Applicant: QUALCOMM Incorporated, San Diego, CA (US)

(72) Inventors: Olivier Alavoine, San Diego, CA (US); Sejoong Lee, San Diego, CA (US); Tauseef Kazi, San Diego, CA (US); Simon Booth, San Diego, CA (US); Edoardo Regini, San Diego, CA (US); Renatas Jakushokas, San Diego, CA (US); Saurabh Patodia, San Jose, CA (US); Jeffrey Gemar, San Diego, CA (US); Michael Hawjing Lo, San Diego, CA (US); Vinod Chamarty, San Diego, CA (US); Boris Andreev, San Diego, CA (US); Tao Shen, San Diego, CA (US); Aravind Bhaskara, San Diego, CA (US); Wenbiao Wang, San Diego, CA (US); Stephen Molloy, Carlsbad, CA (US)

(73) Assignee: Qualcomm Incorporated, San Diego, CA (US)

(*) Notice: Subject to any disclaimer, the term of this patent is extended or adjusted under 35 U.S.C. 154(b) by 137 days.

(21) Appl. No.: 15/944,041

(22) Filed: Apr. 3, 2018

(65) Prior Publication Data
US 2018/0225066 A1 Aug. 9, 2018

Related U.S. Application Data

(63) Continuation of application No. 15/016,806, filed on Feb. 5, 2016, now Pat. No. 9,965,220.

(51) Int. Cl.
*G06F 1/32* (2019.01)
*G06F 12/08* (2016.01)
(Continued)

(52) U.S. Cl.
CPC .......... *G06F 3/0659* (2013.01); *G06F 1/3275* (2013.01); *G06F 3/0625* (2013.01);
(Continued)

(58) Field of Classification Search
CPC ...................................... G06F 1/26; G06F 1/32
See application file for complete search history.

(56) References Cited

U.S. PATENT DOCUMENTS

| 3,736,569 A | 5/1973 | Bouricius et al. |
| 5,931,951 A | 8/1999 | Ando |

(Continued)

FOREIGN PATENT DOCUMENTS

EP 2073097 A2 6/2009

OTHER PUBLICATIONS

International Search Report and Written Opinion—PCT/US2017/012514—ISA/EPO—dated Jan. 18, 2018.
(Continued)

*Primary Examiner* — Phil K Nguyen
(74) *Attorney, Agent, or Firm* — The Marbury Law Group

(57) ABSTRACT

Various aspects include methods for managing memory subsystems on a computing device. Various aspect methods may include determining a period of time to force a memory subsystem on the computing device into a low power mode, inhibiting memory access requests to the memory subsystem during the determined period of time, forcing the memory subsystem into the low power mode for the determined period of time, and executing the memory access requests to the memory subsystem inhibited during the determined period of time in response to expiration of the determined period of time.

30 Claims, 8 Drawing Sheets

(51) Int. Cl.
*G06F 3/06* (2006.01)
*G06F 1/3234* (2019.01)

(52) U.S. Cl.
CPC .......... *G06F 3/0673* (2013.01); *G06F 12/08* (2013.01); *G06F 1/32* (2013.01); *Y02D 10/13* (2018.01); *Y02D 10/14* (2018.01)

(56) References Cited

U.S. PATENT DOCUMENTS

| | | | |
|---|---|---|---|
| 5,933,159 A | 8/1999 | Choi | |
| 5,974,439 A | 10/1999 | Bollella | |
| 6,032,232 A | 2/2000 | Lindeborg et al. | |
| 6,069,833 A | 5/2000 | Koura | |
| 7,061,428 B1 | 6/2006 | Amir et al. | |
| 7,127,573 B1 | 10/2006 | Strongin et al. | |
| 7,194,646 B1* | 3/2007 | Watts, Jr. | G06F 1/206 713/322 |
| 7,587,559 B2 | 9/2009 | Brittain et al. | |
| 8,255,631 B2 | 8/2012 | Chen et al. | |
| 8,707,002 B2 | 4/2014 | Ueda | |
| 9,170,753 B2 | 10/2015 | Chen et al. | |
| 9,348,393 B1* | 5/2016 | Jane | G06F 1/26 |
| 9,666,266 B1 | 5/2017 | Ji et al. | |
| 2003/0105983 A1* | 6/2003 | Brakmo | G06F 1/3203 713/320 |
| 2005/0066330 A1 | 3/2005 | Kanai et al. | |
| 2008/0126616 A1 | 5/2008 | Kumasawa et al. | |
| 2008/0276236 A1 | 11/2008 | Branover et al. | |
| 2009/0031156 A1* | 1/2009 | Barth | G06F 1/3203 713/323 |
| 2010/0153590 A1 | 6/2010 | Hsin et al. | |
| 2010/0185882 A1 | 7/2010 | Arnold et al. | |
| 2011/0173474 A1* | 7/2011 | Salsbery | G06F 1/206 713/323 |
| 2012/0079482 A1 | 3/2012 | Wang et al. | |
| 2012/0151159 A1* | 6/2012 | Muralimanohar | A01N 65/00 711/154 |
| 2013/0290758 A1 | 10/2013 | Quick et al. | |
| 2014/0245044 A1 | 8/2014 | Frid | |
| 2014/0325249 A1 | 10/2014 | Toyotaka | |
| 2015/0006924 A1 | 1/2015 | Jain et al. | |
| 2015/0026493 A1 | 1/2015 | Kim et al. | |
| 2015/0160718 A1* | 6/2015 | Cui | G06F 11/07 713/320 |
| 2015/0378424 A1 | 12/2015 | Anyuru | |
| 2017/0228196 A1 | 8/2017 | Alavoine et al. | |

OTHER PUBLICATIONS

Partial International Search Report—PCT/US2017/012514—ISA/EPO—dated Oct. 10, 2017.

* cited by examiner

FORCED IDLING OF MEMORY SUBSYSTEMS

CROSS-REFERENCE TO RELATED APPLICATION

This application is a continuation of U.S. Non-Provisional patent application Ser. No. 15/016,806, entitled "Forced Idling of Memory Subsystems", filed Feb. 5, 2016, which is assigned to the assignee hereof and incorporated herein by reference in its entirety for all purposes.

BACKGROUND

Various computing devices, including desktop computers, laptops, tablets, and mobile computing devices such as smart phones, include a number of memory subsystems for storing information. A memory subsystem may include a memory controller, a physical layer interface, the memory itself, and other components. One or more master components, such as processors, may access the memory subsystem to read or write data during various operations of the computing device.

Memory subsystems typically have a number of low power modes in which the subsystems consume less power than in normal active operation. The memory subsystems may be put into a low power mode during idle times between memory access operations—the longer the idle time, the lower the power mode may be. Power is expended to enter and exit a low power mode, and the power overhead is greater when entering a lower power mode. Thus, power is saved only if the sleep duration is longer than a certain threshold time (a break-even time), and the longer the sleep duration, the more power that is saved.

However, idle times are typically fragmented and difficult to predict because memory access requests may originate from multiple master components. This makes it more difficult for a memory controller to determine the low power mode that a memory subsystem should enter at any given time. Also, randomly occurring memory accesses expend more power than consecutive memory accesses because power is expended in initiating and/or ending each memory access. Further, the actual sleep duration for a memory subsystem may be shorter than the idle time because of a hysteresis timer that prevents a full transition to low power mode if the idle duration is too short. All of these issues increase the power consumption of the memory subsystem despite the availability of low power modes.

SUMMARY

Various aspects include methods for managing memory subsystems on a computing device. Various aspects may include determining a period of time to force a memory subsystem on the computing device into a low power mode, inhibiting memory access requests to the memory subsystem during the determined period of time, forcing the memory subsystem into the low power mode for the determined period of time, and executing the memory access requests to the memory subsystem inhibited during the determined period of time in response to expiration of the determined period of time.

In some aspects, executing the memory access requests to the memory subsystem inhibited during the determined period of time in response to expiration of the determined period of time may further include consecutively executing the memory access requests to the memory subsystem inhibited during the determined period of time.

In some aspects, determining the period of time to force the memory subsystem into the low power mode may further include monitoring a plurality of system variables of the computing device and determining the period of time based on the plurality of system variables. The plurality of system variables may include at least one of average bandwidth demand of the memory subsystem, input queue length of the memory subsystem, memory utilization during active periods of the memory subsystem, quality of service requirements, and stall cycles of one or more components accessing the memory subsystem.

In some aspects, determining the period of time to force the memory subsystem into the low power mode may further include determining an actual frequency at which the memory subsystem is clocked, determining a frequency of a dynamic clock and voltage scaling unit in the computing device, and determining the period of time based on the actual frequency and the frequency of the dynamic clock and voltage scaling algorithm.

Some aspects may further include selecting the low power mode from a plurality of low power modes based on the determined period of time. Some aspects may further include determining whether a latency-critical process is initiating memory access requests, and setting the memory subsystem in an active power mode in response to determining that a latency-critical process is initiating memory access requests.

Further aspects include a computing device including a memory and a processor configured with processor-executable instructions to perform operations of the methods described herein. Further aspects include a non-transitory processor-readable storage medium having stored thereon processor-executable software instructions configured to cause a processor of a computing device to perform operations of the methods described herein. Further aspects include a computing device that includes means for performing functions of the operations of the methods described herein.

BRIEF DESCRIPTION OF THE DRAWINGS

The accompanying drawings, which are incorporated herein and constitute part of this specification, illustrate example aspects, and together with the general description given above and the detailed description given below, serve to explain the features of the claims.

DETAILED DESCRIPTION

Figure 1:
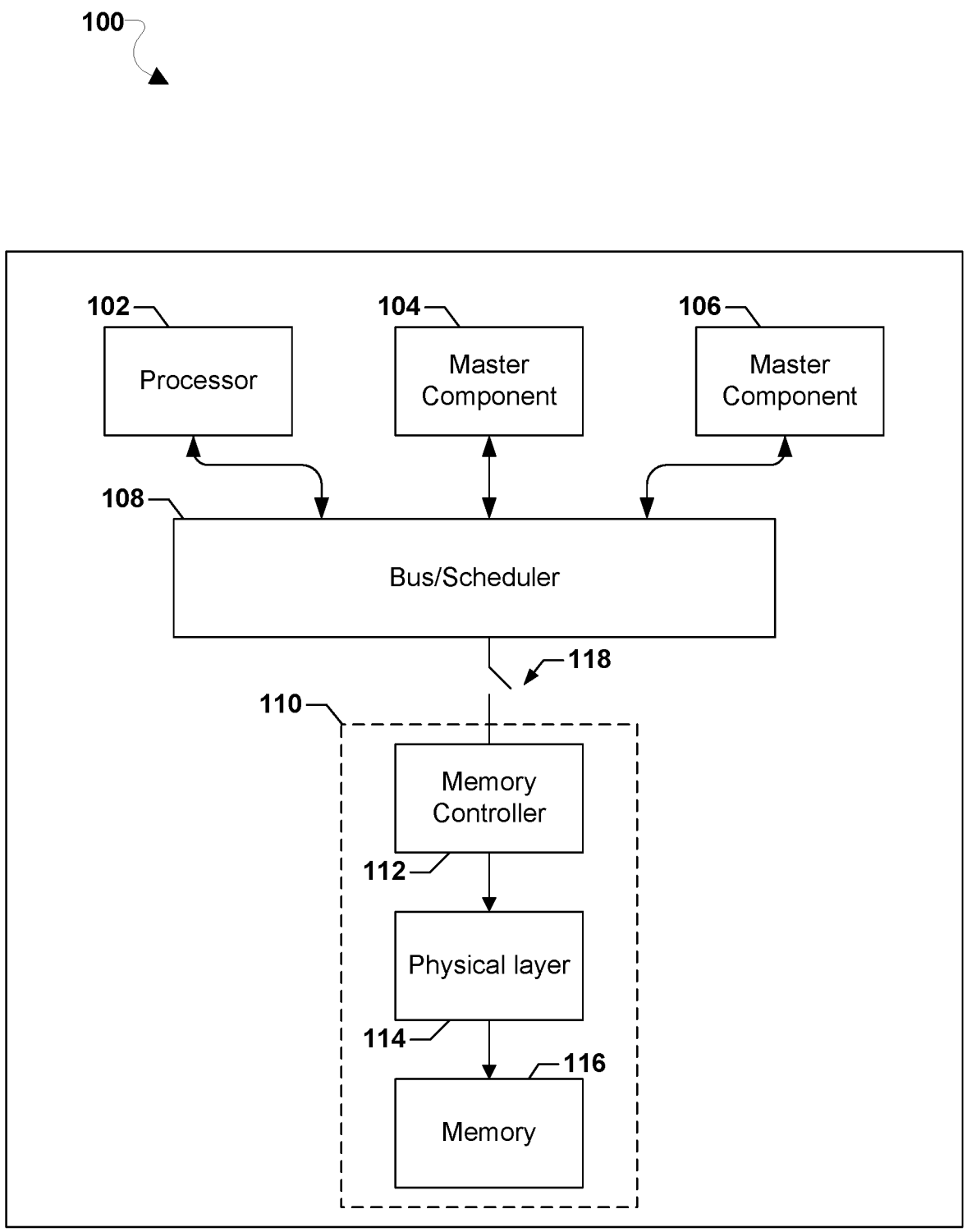
FIG. 1 is a block diagram of a computing device for use with various aspects.

Various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the written description or the claims.

As used herein, the term "computing device" refers to any one or all of cellular telephones, smart phones, personal or mobile multi-media players, personal data assistants, desktop computers, laptop computers, tablet computers, servers, smart watches, smart books, palm-top computers, wireless electronic mail receivers, multimedia Internet-enabled cellular telephones, wireless gaming controllers, and similar personal or enterprise electronic devices that includes a programmable processor and memory.

Memory subsystems in computing devices may have a number of different power modes. For example, in active power mode the memory subsystem may actively process memory access requests from various master components, such as processors in the computing device. During idle times between memory access requests, the memory subsystem may be placed in one or more low power modes. The lower the power mode, the less power is consumed, but more power and time may be consumed in entering and exiting the lowest power modes.

Typically, the timing and duration of memory access requests is difficult to predict. Thus, determining the optimal power mode and duration that the memory subsystem should be in may be difficult at a given moment. Adding to the difficulty is the fact that the actual sleep duration for a memory subsystem may be shorter than the idle time because of a hysteresis timer that prevents full transition to a low power mode if the idle duration is too short. Initiating and ending each memory access may also consume additional power.

In overview, various aspects provide systems and methods for managing memory subsystems on a computing device. Various aspects may include determining a period of time to force a memory subsystem on a computing device into a low power mode. The period of time may be determined using feedback control, for example by monitoring a plurality of system variables of the computing device and determining the period of time based on the plurality of system variables. Alternatively, the period of time may be determined using open loop control, for example by determining an actual frequency of the memory subsystem and a frequency determined by a dynamic clock and voltage scaling (DCVS) unit in the computing device, and determining the period of time based on the actual frequency and the DCVS frequency.

The various aspect methods may further include forcing the memory subsystem into the low power mode for the determined period of time, during which a plurality of memory access requests to the memory subsystem are inhibited. The low power mode may be selected from a plurality of low power modes based on the determined period of time. The various aspect methods may further include executing the plurality of memory access requests to the memory subsystem after the determined period of time has expired. The plurality of memory access requests initially inhibited during the determined period of time may execute consecutively, thereby saving power.

FIG. 1 is a functional block diagram of a computing device 100 suitable for implementing various aspects. The computing device 100 may be, among other things, a desktop computer, laptop, tablet, any type of mobile electronic device, a server or any type of consumer or enterprise electronic device. The computing device 100 may include a general processor 102 for executing software instructions for an operating system and applications executing on the computing device 100. The computing device 100 may also have a number of other master components 104, 106 that may be additional processors (e.g., graphics processors, modem processors) or other components that may generate memory access requests.

The computing device 100 may also include one or more memory subsystems 110. The memory subsystem 110 may include a memory controller 112 for processing and controlling memory access requests. The memory controller 112 may control a physical access layer 114 to access specific addresses/locations in memory 116 according to the memory access requests. The memory 116 may be a non-transitory computer-readable storage medium that stores processor-executable instructions as well as data generated and used by applications. The memory 116 may be configured for double data rate (DDR) memory access, or other additional memory access features. In some aspects, the memory controller 112 may be outside of the memory subsystem 110 and may control multiple memory subsystems. The memory subsystem 110 may have additional components not illustrated in FIG. 1.

A switch 118 may connect the memory subsystem 110 with a bus/scheduler 108. The processor 102 and the additional master components 104, 106 may send memory access requests to the bus/scheduler 108. The bus/scheduler 108 may have an arbiter, multiplexer, or other control component for receiving, ordering, and forwarding memory access requests to the memory subsystem 110. The switch 118 may be controlled by an enable signal. A low power mode in the memory subsystem 110 may be triggered by sending an enable signal that opens the switch 118, which prevents memory access requests from reaching the memory subsystem 110. Similarly, the memory subsystem 110 may exit the low power mode back into active mode by sending an enable signal that closes the switch 118. Thus, controlling the switch 118 may allow the memory subsystem 118 to be forced into a low power mode for a predetermined amount of time. The switch 118 may be implemented in hardware, but may also be implemented in software, such as a flag that indicates when memory access requests may be and may not be processed by the memory controller 112.

The computing device 100 may also include various other components not illustrated in FIG. 1. For example, the computing device 100 may include a number of input, output, and processing components such as a speaker, microphone, modem, transceiver, subscriber identification module (SIM) card, keypad, mouse, display screen or touchscreen, various connection ports, audio or graphics processor, additional hard drives, and many other components known in the art.

Figure 2:
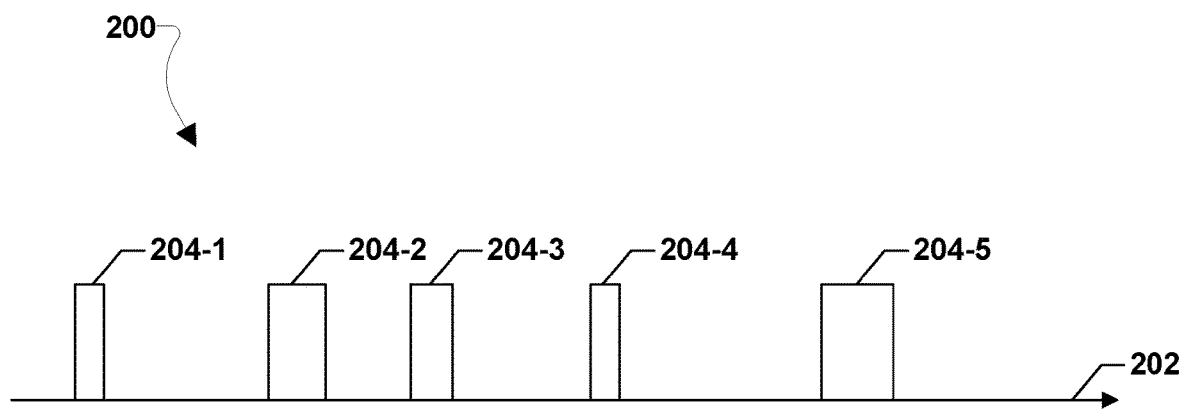
FIG. 2 is a timing diagram illustrating memory access requests for a memory subsystem.

FIG. 2 is a timing diagram 200 illustrating memory access requests that may be sent to a memory subsystem (e.g., the memory subsystem 110). The memory subsystem may receive an input signal 202 carrying memory access requests 204-1 through 204-5. The memory access requests 204-1 through 204-5 may be read requests or write requests and may be initiated by one or more master components in the computing device (e.g., the processor 102 and the master components 104, 106). A memory controller in the memory subsystem (e.g., the memory controller 112) may receive the memory access requests 204-1 through 204-5 and access the relevant addresses in the memory in response to each request.

Power may be consumed by the memory subsystem to initiate and end each memory access request 204-1 through 204-5. Thus non-consecutive memory access requests 204-1 through 204-5, such as shown in the timing diagram 200, may consume more power than consecutive memory access requests.

The memory subsystem may enter a low power mode between memory access requests to save power. Entering and exiting a low power mode may consume power, and so entering a low power mode may only be beneficial if the power saved during the duration of low power mode is greater than the power consumed entering and exiting the low power mode. However, the memory access requests are typically spread unevenly over time, as illustrated in the memory access requests 204-1 through 204-5 illustrated in FIG. 2, and thus the time between each of the memory access requests 204-1 through 204-5 may be short. For example, if the memory subsystem attempts to enter a low power mode between each of the memory access requests 204-1 through 204-5, the frequent switches between a low power mode and the active mode may not save power compared to leaving the memory subsystem in the active mode.

Thus, the timing diagram 200 illustrates that typical memory operations make it difficult for a computing device to save power by putting a memory subsystem into a low power mode between memory accesses, because the time between memory accesses is often short and typically unpredictable.

The systems and methods of the various aspects provide a way to manage memory accesses so that a memory subsystem can be placed into a low power mode in a deterministic and power-efficient manner. Specifically, memory accesses may be temporarily inhibited for a predetermined time period during which the memory subsystem may be forced into a low power mode long enough to save power. This predetermined amount of time may be calculated to balance the power savings with the performance impact to the computing device. When the predetermined time period ends, the memory access requests that were temporarily inhibited may be executed consecutively, further saving power.

Figure 3:
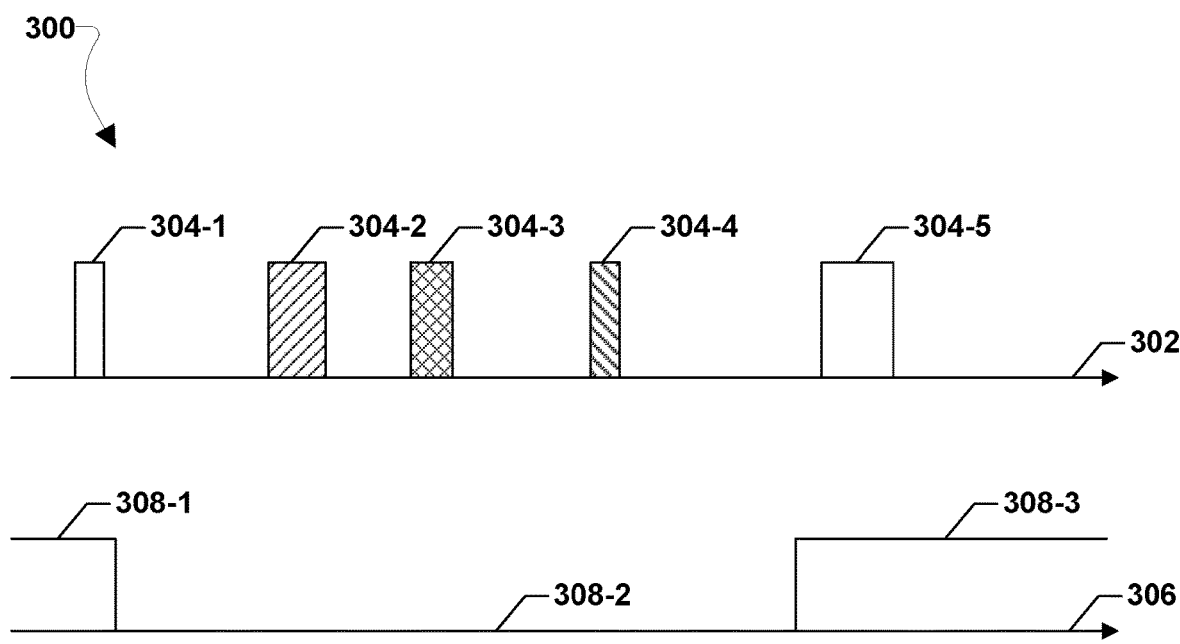
FIG. 3 is a timing diagram illustrating inhibiting and batch processing memory access requests for a memory subsystem according to various aspects.
Figure 3:

FIG. 3 is a timing diagram 300 illustrating memory access requests that may be sent to a memory subsystem (e.g., the memory subsystem 110) according to various aspects. The memory subsystem may receive an input signal 302 carrying memory access requests 304-1 through 304-5. The memory access requests 304-1 through 304-5 may be read requests or write requests and may be initiated by one or more master components in the computing device (e.g., the processor 102 and the master components 104, 106).

An enable signal 306 may be used to control access to the memory subsystem (e.g., through the switch 118). When the enable signal is high (e.g., time periods 308-1 and 308-3), memory access requests may be sent to the memory subsystem. When the enable signal is low (e.g., time period 308-2), memory access requests may be blocked or inhibited from reaching the memory subsystem (e.g., by opening the switch 118).

In various aspects, the enable signal 306 may also be used to allow a memory subsystem to enter a low power mode during the time period 308-2, which may be a predetermined time period. The enable signal 306 may be set to low during the time period 308-2 even though the memory access requests 304-2, 304-3, and 304-4 are received during the time period 308-2. The memory access requests 304-2, 304-3, and 304-4 may be inhibited, cached, or paused, for the duration of the time period 308-2. The memory controller 112, the bus/scheduler 108, or another component may temporarily store (e.g., cache) the memory access requests 304-2, 304-3, and 304-4 during the time period 308-2. When the time period 308-2 expires, the memory access requests 304-2, 304-3, and 304-4 may be processed as illustrated in the memory controller output signal 310. With the memory access requests 304-2, 304-3, and 304-4 released for execution at one time, the memory access requests may be performed consecutively in the time period 308-3, along with new memory access request 304-5. Thus, temporarily inhibiting the memory access requests 304-2, 304-3, and 304-4 during the time period 308-2 enables memory accesses that would otherwise be spread out over time to be performed more or less consecutively (effectively batch processed).

Forcing the memory subsystem into low power mode during the time period 308-2 may save power in multiple ways. For example, the time period 308-2 may be long enough so that the power saved in low power mode may be greater than the power consumed entering and exiting the low power mode. In addition, when the time period 308-2 has expired, the pending memory access requests 304-2 through 304-5 may be batch processed consecutively, saving power when compared to processing each memory access request non-consecutively.

The memory subsystem may be capable of entering several different low power modes exhibiting different levels of power saving. The lower the power consumed in each low power mode, the more power that is saved. However, the lowest power modes may consume more power and take more time to enter and exit the power mode (e.g., to power down and then warm up memory system components). Thus, while the lowest power modes may save more power per unit time, entering such modes may save very little power unless the low power mode duration is sufficiently long.

Based on the different levels of power savings and different amounts of power consumed entering/exiting each low power mode, the duration of the time period 308-2 may be used to select the appropriate low power mode that the memory subsystem should enter during the time that memory accesses are inhibited (i.e., 308-2). For example, if the time period 308-2 lasts for a relatively long time (e.g., 10 microseconds), the memory subsystem may enter a lower power mode than if the time period 308-2 lasts for a shorter time (e.g., 1 microsecond). If one or more latency critical processes are executing (e.g., memory intensive applications with high quality of service levels), the computing device may disable power saving features for the duration of the latency critical processes.

Figure 4:
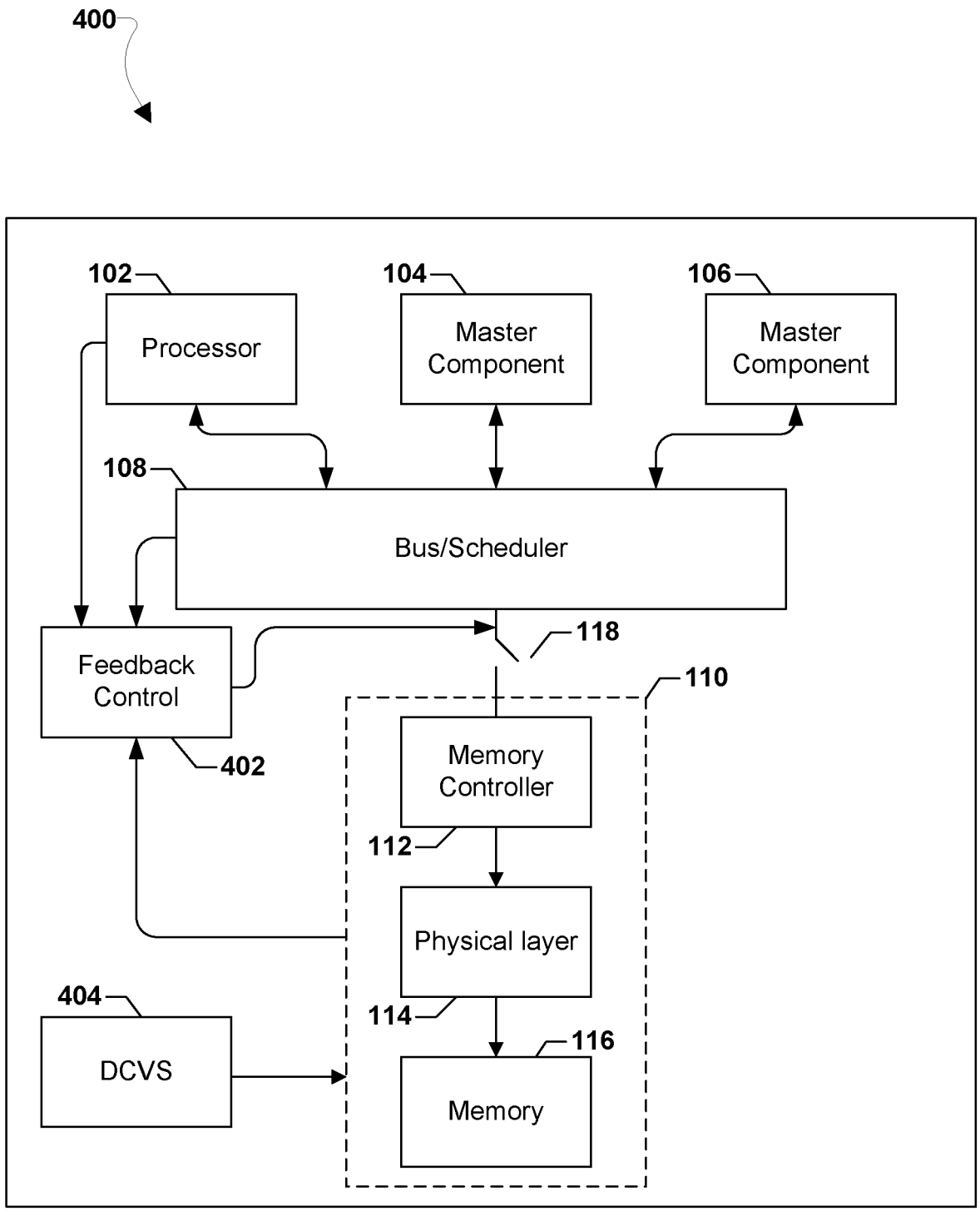
FIG. 4 is a block diagram of a computing device for use with various aspects.

The computing device may determine the duration of the time period 308-2 using either feedback control or open loop control. FIG. 4 is a functional block diagram 400 of a computing device 100 configured to use feedback control to determine the time duration of forced low power of a memory subsystem according to various aspects. The computing device 100 in FIG. 4 may include the same or similar components as discussed with reference to FIG. 1.

The computing device 100 may additionally include a dynamic clock and voltage scaling (DCVS) unit 404 that may be configured to determine the frequency of a dynamic clocking signal to the memory subsystem 110. The computing device 100 may also include a feedback control unit 402 that is configured to provide an enable signal for the switch 118.

The feedback control unit 402 may take as inputs various system variables obtained from the processor 102, the master components 104, 106, the bus/scheduler 108, the memory subsystem 110, and other components. The feedback control unit 402 may monitor and utilize the system variables to calculate the time duration of a forced low power mode ($T_{down}$) for the memory subsystem 110. The feedback control unit 402 may be configured to balance the power savings from the forced low power mode with performance requirements of the computing device 100. As the system variables change, the duration $T_{down}$ may become longer (e.g., if the computing device 100 is idle) or shorter (e.g., if a memory intensive application is executing on the computing device 100).

The input system variables for the feedback control unit 402 may include, but are not limited to, average bandwidth demand of the memory subsystem 110, input queue length of the memory subsystem 110, memory utilization during active periods of the memory subsystem 110, quality of service requirements of various applications or master components, and stall cycles of one or more components accessing the memory subsystem 110.

Figure 5:
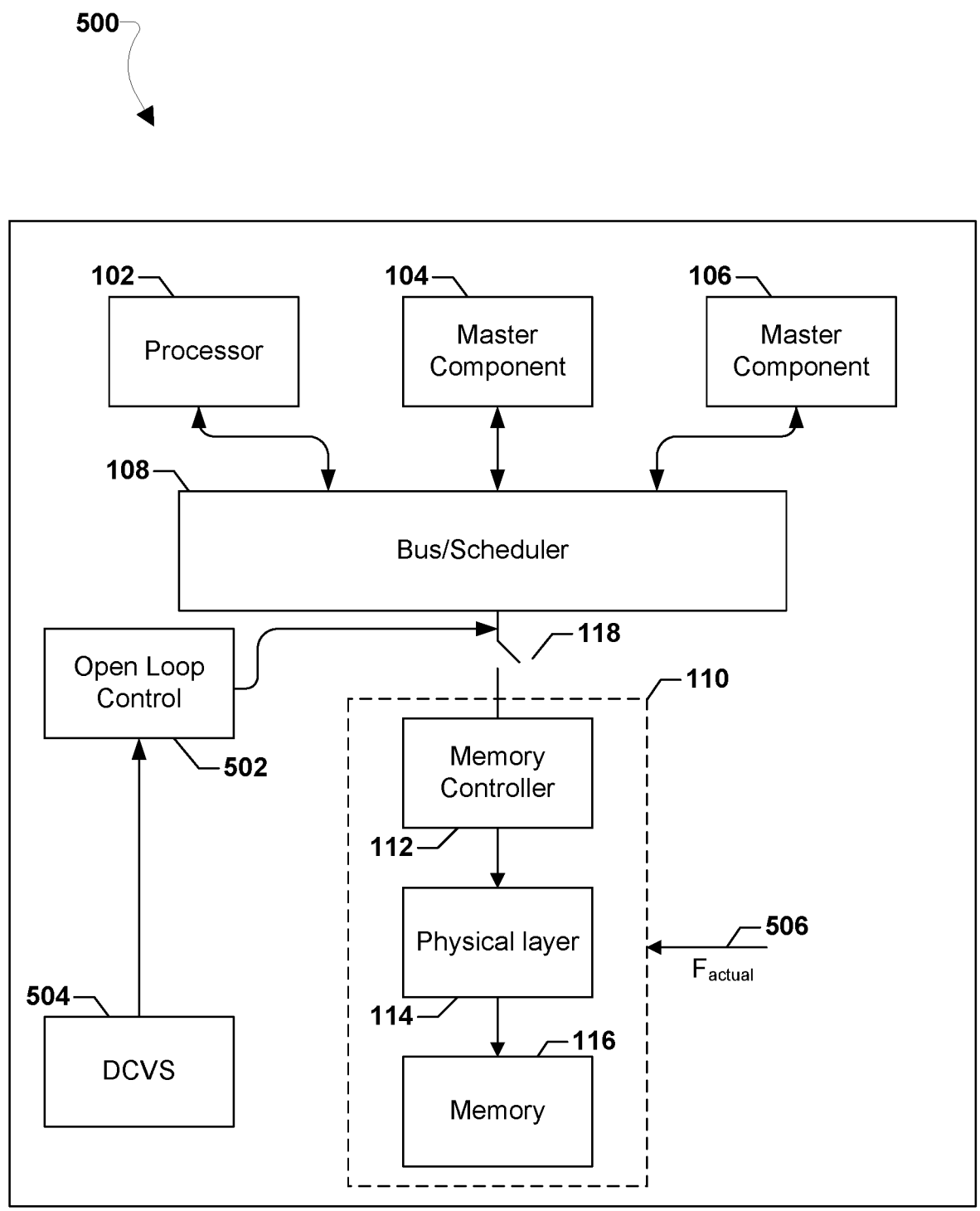
FIG. 5 is a block diagram of a computing device for use with various aspects.

FIG. 5 is a functional block diagram 500 of the computing device 100 configured to use open loop control to determine the time duration of forced low power of a memory subsystem according to various aspects. The computing device 100 in FIG. 5 may include the same or similar components as discussed with reference to FIG. 1.

The computing device 100 may additionally include a dynamic clock and voltage scaling (DCVS) unit 504 and an open loop control unit 502 that is configured to provide an enable signal for the switch 118. Although the DCVS unit 504 may normally determine the frequency of the clocking signal for the memory subsystem 110, the memory subsystem 110 may be clocked at a different actual frequency 506, denoted as $F_{actual}$. The actual frequency 506 may be the maximum frequency at which the memory subsystem 110 may be clocked, or may be a frequency lower than the maximum frequency but higher than the frequency determined by the DCVS unit 504. The value of the actual frequency 506 may be selected to reduce power consumption in coordination with the open loop control unit 502.

The open loop control unit 502 may take as an input the frequency of the clocking signal as determined by the DCVS unit 504, denoted as $F_{DCVS}$. The open loop control unit 502 may calculate the duration of a forced low power mode ($T_{down}$) for the memory subsystem 110 based on the values of $F_{actual}$ and $F_{DCVS}$. The open loop control unit 502 may be configured to provide memory access performance that is comparable to the performance if the memory subsystem 110 were clocked at the frequency determined by the DCVS unit 504. For example, the open loop control unit 502 may calculate $T_{down}$ as equal to the latency of the memory subsystem 110 when clocked at $F_{DCVS}$ minus the latency of the memory subsystem 110 when clocked at $F_{actual}$ (i.e., $T_{down}$=latency at $F_{DCVS}$–latency at $F_{actual}$). The time duration that the memory subsystem 110 is active, or the duty cycle, may be denoted $F_{active}$ and may be the ratio of $F_{DCVS}$ to $F_{actual}$ (i.e., $F_{active}=F_{DCVS}/F_{actual}$).

Figure 6:
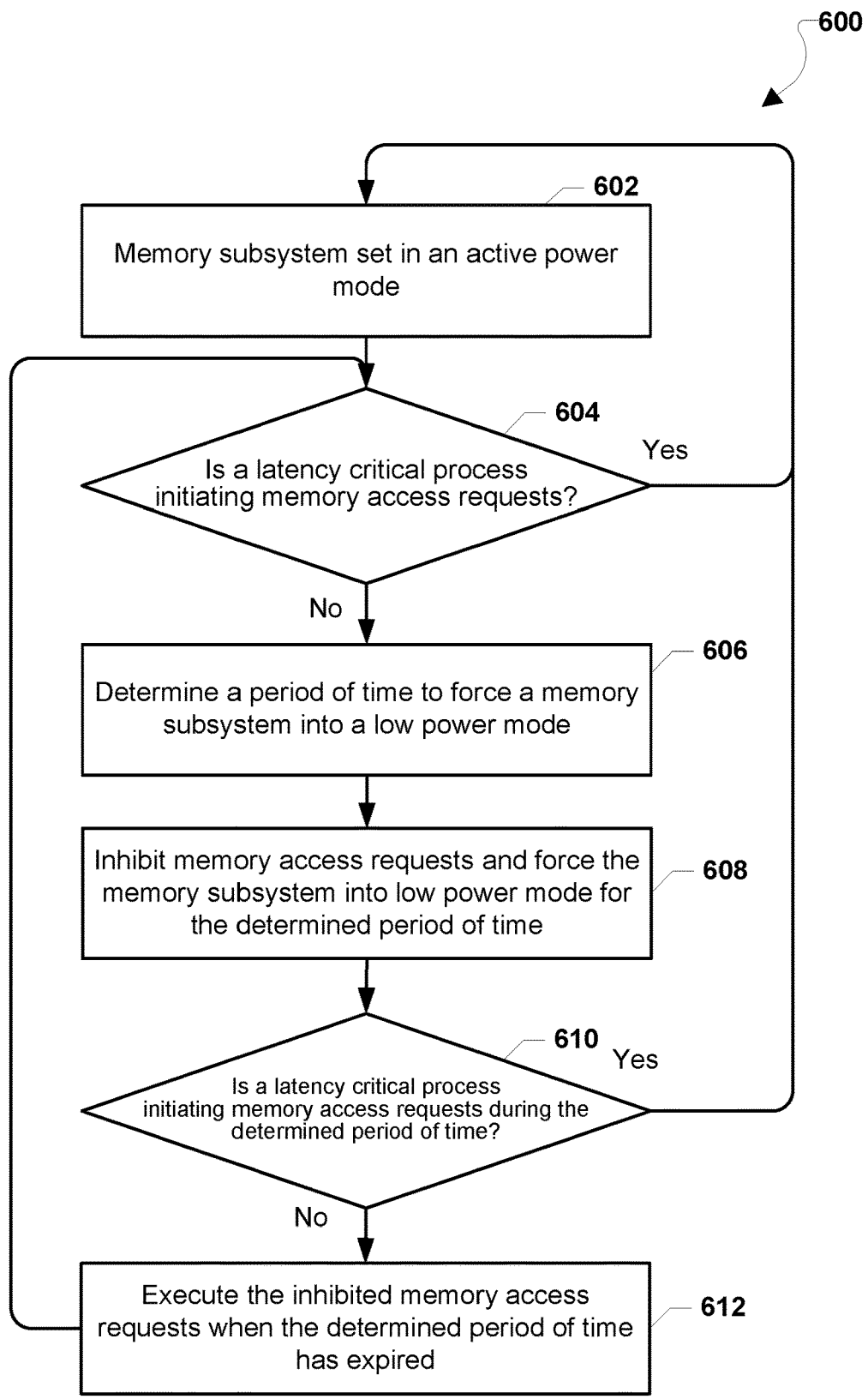
FIG. 6 is a process flow diagram illustrating a method for managing memory subsystems on a computing device according to various aspects.

FIG. 6 illustrates a method 600 for managing memory subsystems on a computing device according to various aspects. With reference to FIGS. 1-6, the method 600 may be implemented with a processor (e.g., the processor 102, the memory controller 112, and/or the like) of a computing device (such as the computing device 100) having one or more memory subsystems.

In block 602, the processor may set the memory subsystem to an active power mode to process incoming memory access requests. In determination block 604, the processor may determine whether a latency-critical process is initiating one or more memory access requests.

In response to determining that a latency-critical process is initiating one or more memory access requests (i.e., determination block 604="Yes"), the processor may continue to set the memory subsystem in the active power mode for the duration of the latency-critical process in block 602.

In response to determining that a latency critical process is not initiating one or more memory access requests (i.e., determination block 604="No"), the processor may determine a period of time to inhibit memory accesses and force a memory subsystem of a computing device into a low power mode in block 606. The memory subsystem may be capable of entering one of several low power modes. The period of time may be determined utilizing feedback control in method 700 as described with reference to FIG. 7, or open loop control in method 800 as described in with reference to FIG. 8.

In block 608, the processor may force the memory subsystem into a selected low power mode for the determined period of time. During the determined period of time, the processor may inhibit or pause a plurality of memory access requests sent to the memory subsystem by one or more master components, such as various processors. The low power mode selected and entered by the memory subsystem may be based on the duration of the determined period of time. For example, the longer the determined period of time, the lower the power mode the memory subsystem may enter.

In determination block 610, the processor may determine whether a latency-critical process is initiating one or more memory access requests during the determined period of time. In response to determining that a latency-critical process is initiating one or more memory access requests during the determined period of time (i.e., determination block 610="Yes"), the processor may set the memory subsystem in the active power mode for the duration of the latency-critical process in block 602. In other words, the processor may terminate the low power mode earlier than the determined period of time in order to process the memory access requests from the latency-critical process.

In response to determining that a latency-critical process is not initiating one or more memory access requests during the determined period of time (i.e., determination block 610="No"), the processor may execute the plurality of memory access requests after the determined period of time has expired in block 612. The processor may process the accumulated memory access requests consecutively. The processor may then re-determine whether a latency-critical process is initiating memory access requests in determination block 604. If no latency critical processes are executing, the processor may determine another period of time to force the memory subsystem into a low power mode in block 606. The re-determination may be based on changing variables in a feedback control loop or open control loop that are used to determine the period of time. In this manner, the method 600 provides a way to deterministically force a memory subsystem into a low power state to save power while meeting performance requirements.

Figure 7:
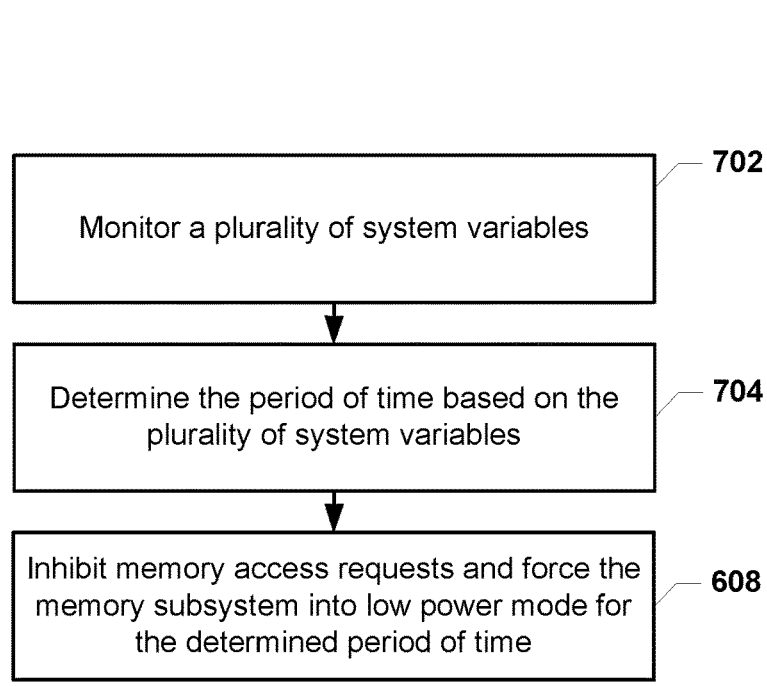
FIG. 7 is a process flow diagram illustrating a method for determining a period of time to force a memory subsystem into a low power mode according to various aspects.

FIG. 7 illustrates a method 700 for determining a period of time to force a memory subsystem into a low power mode using feedback control according to various aspects. With reference to FIGS. 1-7, the method 700 includes operations that may be performed in block 606 of the method 600, and may be implemented with a processor (e.g., the processor 102, the memory controller 112, and/or the like) of a computing device (such as the computing device 100) having one or more memory subsystems.

In block 702, the processor may monitor a plurality of system variables of a computing device. The computing device may include a feedback control unit that receives the system variables as input. The system variables may include, but are not limited to, average bandwidth demand of the memory subsystem, input queue length of the memory subsystem, memory utilization during active periods of the memory subsystem, quality of service requirements of various applications or master components, and stall cycles of one or more components accessing the memory subsystem.

In block 704, the processor may determine the period of time to inhibit memory access requests and force the memory subsystem into a low power mode based on the plurality of system variables. For example, the period of time may be determined to be shorter if system variables indicate that memory accesses occur frequently or performance requirements are high. Alternatively, the period of time may be determined to be longer if the system variables indicate that memory accesses occur infrequently or performance requirements are low. The processor may then force the memory subsystem into the low power mode for the determined period of time in block 608 of the method 600 as described. In this manner, the method 700 allows for forced downtime of a memory subsystem to be determined by a feedback control loop.

Figure 8:
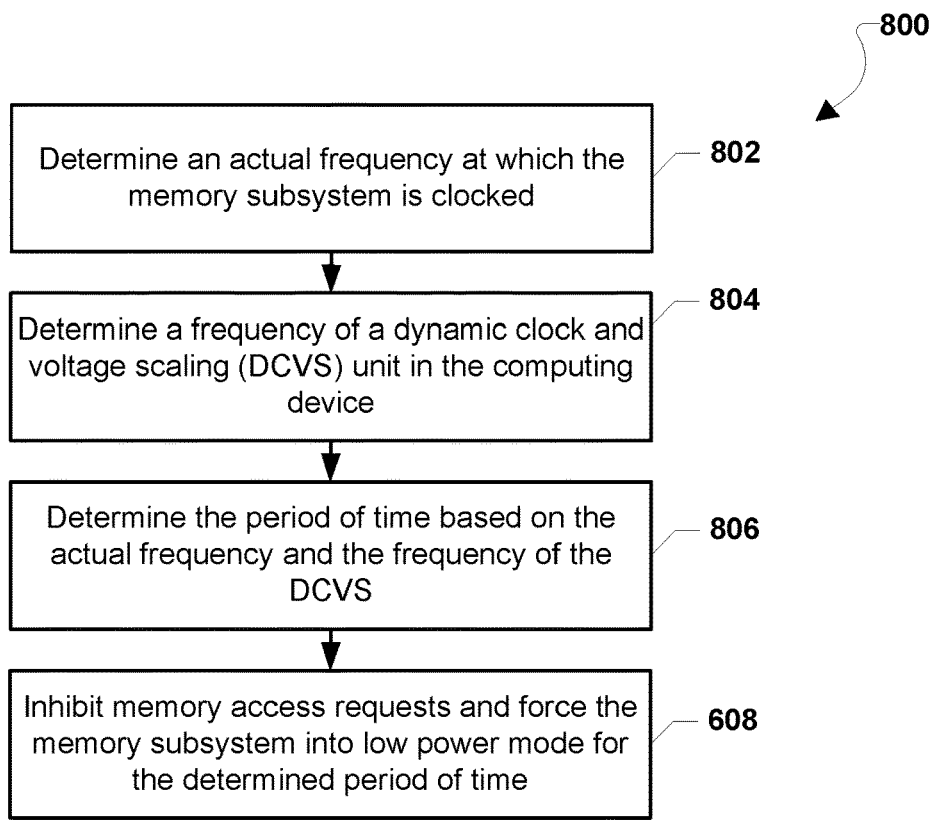
FIG. 8 is a process flow diagram illustrating a method for determining a period of time to force a memory subsystem into a low power mode according to various aspects.

FIG. 8 illustrates a method 800 for determining a period of time to inhibit memory access requests and force a memory subsystem into a low power mode using open loop control according to various aspects. With reference to FIGS. 1-8, the method 800 includes operations that may be performed in block 606 of the method 600, and may be implemented with a processor (e.g., the processor 102, the memory controller 112, and/or the like) of a computing device (such as the computing device 100) having one or more memory subsystems.

In block 802, the processor may determine an actual frequency at which the memory subsystem is clocked. The actual frequency may be the maximum frequency at which the memory subsystem may be clocked, or may be a frequency lower than the maximum frequency. In block 804, the processor may determine a frequency determined by a DCVS unit in the computing device. The DCVS unit may be configured to determine a dynamic system clock frequency to apply to various components in the computing device.

In block 806, the processor may determine the period of time to force the memory subsystem into a low power mode based on the actual frequency of the memory subsystem and the frequency determined by the DCVS unit. For example, the duration of a forced low power mode ($T_{down}$) for the memory subsystem may be calculated as equal to the latency of the memory subsystem when clocked at the DCVS unit frequency $F_{DCVS}$ minus the latency of the memory subsystem when clocked at the actual frequency of the memory subsystem $F_{actual}$ (i.e., $T_{down}$=latency at $F_{DCVS}$–latency at $F_{actual}$). The processor may then force the memory subsystem into the low power mode for the determined period of time in block 608 of the method 600 as described. In this manner, the method 800 allows for forced downtime of a memory subsystem to be determined by an open control loop.

Figure 9:
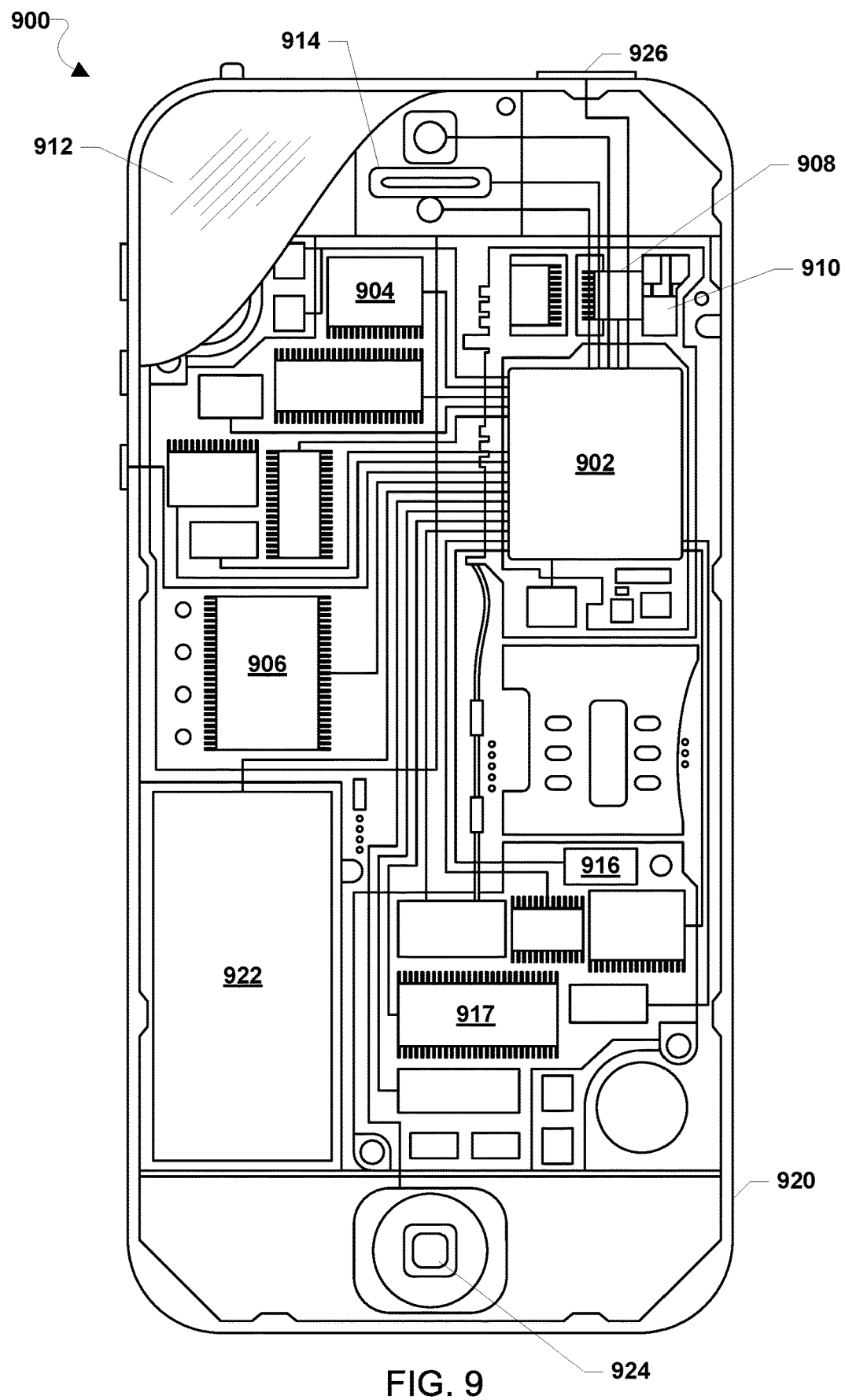
FIG. 9 is a component block diagram of a mobile computing device suitable for implementing some aspect methods.

Various aspects, including the aspects illustrated in FIGS. 4-8, may be implemented in any of a variety of computing devices, an example of which (e.g., computing device 900) is illustrated in FIG. 9. According to various aspects, the computing device 900 may be similar to the computing device 100 as described with reference to FIGS. 4 and 5. As such, the computing device 900 may implement the methods 600, 700, and 800.

The computing device 900 may include a processor 902 coupled to a touchscreen controller 904 and an internal memory 906. The processor 902 may be one or more multi-core integrated circuits designated for general or specific processing tasks. The internal memory 906 may be volatile or non-volatile memory, and may also be secure and/or encrypted memory, or unsecure and/or unencrypted memory, or any combination thereof. The touchscreen controller 904 and the processor 902 may also be coupled to a touchscreen panel 912, such as a resistive-sensing touchscreen, capacitive-sensing touchscreen, infrared sensing touchscreen, etc. Additionally, the display of the computing device 900 need not have touch screen capability.

The computing device 900 may have a cellular network transceiver 908 coupled to the processor 902 and to an antenna 910 and configured for sending and receiving cellular communications. The transceiver 908 and the antenna 910 may be used with the above-mentioned circuitry to implement various aspect methods. The computing device 900 may include one or more SIM cards 916 coupled to the transceiver 908 and/or the processor 902 and may be configured as described herein. The computing device 900 may include a cellular network wireless modem chip 917 that enables communication via a cellular network and may be coupled to the processor.

The computing device 900 may also include speakers 914 for providing audio outputs. The computing device 900 may also include a housing 920, constructed of a plastic, metal, or a combination of materials, for containing all or some of the components discussed herein. The computing device 900 may include a power source 922 coupled to the processor 902, such as a disposable or rechargeable battery. The rechargeable battery may also be coupled to the peripheral device connection port to receive a charging current from a source external to the computing device 900. The computing device 900 may also include a physical button 924 for receiving user inputs. The computing device 900 may also include a power button 926 for turning the computing device 900 on and off.

Figure 10:
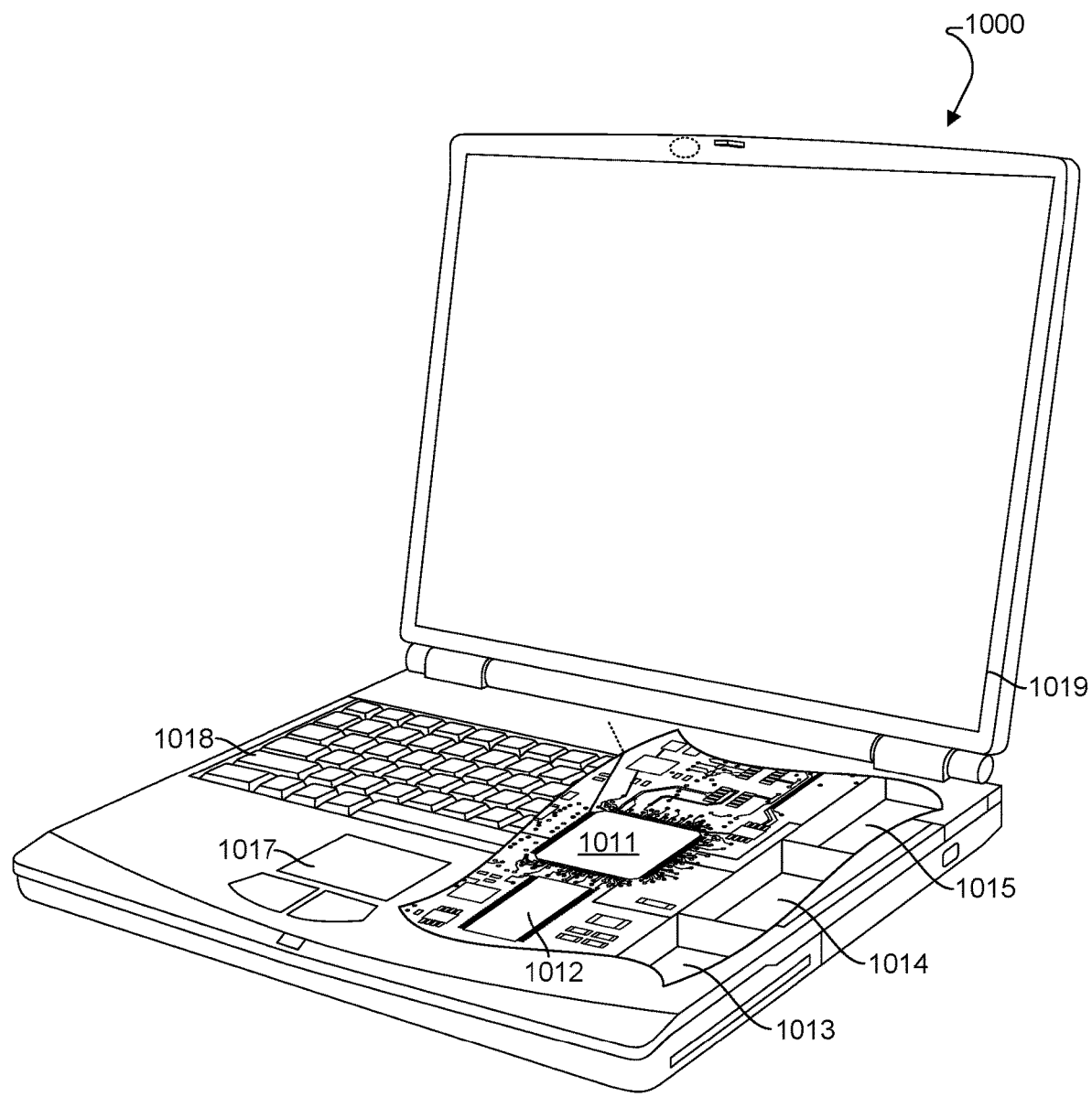
FIG. 10 is a component block diagram of a computing device suitable for implementing some aspect methods.

Various aspects, including the aspects illustrated in FIGS. 4 and 5, may be implemented in any of a variety of computing devices, an example of which (e.g., computing device 1000) is illustrated in FIG. 10. According to various aspects, the computing device 1000 may be similar to the computing device 100 as described with reference to FIGS. 4 and 5. As such, the computing device 1000 may implement the methods 600, 700, and 800.

The computing device 1000 may include a touchpad 1017 that serves as the pointing device of the computing device 1000, and thus may receive drag, scroll, and flick gestures similar to those implemented on wireless devices equipped with a touch screen display and described below. The computing device 1000 will typically include a processor 1011 coupled to volatile memory 1012 and a large capacity nonvolatile memory, such as a disk drive 1013 of Flash memory. The computing device 1000 may also include a floppy disc drive 1014 and a compact disc (CD) drive 1015 coupled to the processor 1011. The computing device 1000 may also include a number of connector ports coupled to the processor 1011 for establishing data connections or receiving external memory devices, such as a universal serial bus (USB) or FireWire® connector sockets, or other network connection circuits for coupling the processor 1011 to a network. In a notebook configuration, the device housing includes the touchpad 1017, the keyboard 1018, and the display 1019 all coupled to the processor 1011. Other configurations of the computing device 1000 may include a computer mouse or trackball coupled to the processor (e.g., via a USB input) as are well known, which may also be used in conjunction with various aspects.

The foregoing method descriptions and the process flow diagrams are provided merely as illustrative examples and are not intended to require or imply that the operations of various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative logical blocks, units, circuits, and algorithm operations described in connection with the aspects disclosed herein may be implemented as electronic hardware, computer software, or combinations of both. To clearly illustrate this interchangeability of hardware and software, various illustrative components, blocks, units, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present aspects.

The hardware used to implement the various illustrative logics, logical blocks, units, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software unit that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of various aspects is provided to enable any person skilled in the art to make or use the claims. Various modifications to these aspects will be readily apparent to those skilled in the art, and the generic principles defined herein may be applied to some aspects without departing from the scope of the claims. Thus, the present disclosure is not intended to be limited to the aspects shown herein but is to be accorded the widest scope consistent with the following claims and the principles and novel features disclosed herein.

What is claimed is:

1. A method for managing a memory subsystem on a computing device, comprising:
    setting the memory subsystem to an active power mode;
    determining a period of time to force the memory subsystem into a low power mode by using open loop control based on a determined actual frequency of the memory subsystem and a frequency determined by a dynamic clock and voltage scaling (DCVS) unit;
    determining an amount of power saved by the memory subsystem in the low power mode for the determined period of time;
    determining an amount of power the memory subsystem consumes entering and exiting the low power mode;
    forcing the memory subsystem into the low power mode for the determined period of time in response to determining that the amount of power saved by the memory subsystem in the low power mode for the determined period of time is greater than the amount of power consumed by the memory subsystem entering and exiting the low power mode; and
    inhibiting memory access requests such that the memory subsystem is prevented from executing any memory access requests during the low power mode.

2. The method of claim 1, wherein setting the memory subsystem to the active power mode comprises sending an enable signal to close a switch.

3. The method of claim 2,
    wherein sending the enable signal to close the switch comprises setting the enable signal to a high value, and wherein forcing the memory subsystem into the low power mode comprises setting the enable signal to a low value for the determined period of time.

4. The method of claim 2, wherein the switch is implemented in software.

5. The method of claim 4, wherein the switch is a flag that indicates whether memory access requests are to be processed by a memory controller.

6. The method of claim 1, further comprises:
receiving a plurality of memory access requests while the memory subsystem is operating in the low power mode; and
sending, to the memory subsystem, the plurality of memory access requests received while the memory subsystem is operating in the low power mode.

7. The method of claim 6,
wherein sending the plurality of memory access requests received while the memory subsystem is in the low power mode comprises sending, to a memory controller, each of the plurality of memory access requests in response to receiving each of the plurality of memory access requests while the memory system is operating in the low power mode, and
wherein the memory controller is configured to send the plurality of memory access requests to the memory of the memory subsystem in response to the memory subsystem being set to the active power mode.

8. The method of claim 6, wherein the determined period of time is based on one or more of an average bandwidth demand of the memory subsystem, an input queue length of the memory subsystem, memory utilization during active power modes of the memory subsystem, quality of service requirements, and stall cycles of one or more components accessing the memory sub system.

9. A computing device, comprising:
a memory subsystem including a memory; and
a processor coupled to the memory subsystem, and configured with processor-executable instructions to:
set the memory subsystem to an active power mode;
determine a period of time to force the memory subsystem into a low power mode by using open loop control based on a determined actual frequency of the memory subsystem and a frequency determined by a dynamic clock and voltage scaling (DCVS) unit;
determine an amount of power saved by the memory subsystem in the low power mode for the determined period of time;
determine an amount of power the memory subsystem consumes entering and exiting the low power mode;
force the memory subsystem into the low power mode for the determined period of time in response to determining that the amount of power saved by the memory subsystem in the low power mode for the determined period is greater than the amount of power consumed by the memory subsystem entering and exiting the low power mode; and
inhibit memory access requests such that the memory subsystem is prevented from executing any memory access requests during the low power mode.

10. The computing device of claim 9, wherein the processor is configured with processor-executable instructions to set the memory subsystem to the active power mode by sending an enable signal to close a switch.

11. The computing device of claim 10, wherein the processor is configured with processor-executable instructions to:

send the enable signal to close the switch by setting the enable signal to a high value; and
force the memory subsystem into the low power mode by setting the enable signal to a low value for the determined period of time.

12. The computing device of claim 10, wherein the switch is implemented in software.

13. The computing device of claim 12, wherein the switch is a flag that indicates whether memory access requests are to be processed by a memory controller.

14. The computing device of claim 9, wherein the processor is configured with processor-executable instructions to:
receive a plurality of memory access requests while the memory subsystem is operating in the low power mode; and
send, to the memory subsystem, the plurality of memory access requests received while the memory subsystem is operating in the low power mode.

15. The computing device of claim 14, wherein the processor is configured with processor-executable instructions to send the plurality of memory access requests received while the memory system is operating in the low power mode by sending, to a memory controller, each of the plurality of memory access requests in response to receiving each of the plurality of memory access requests while the memory subsystem is operating in the low power mode.

16. The computing device of claim 15, wherein the memory subsystem includes the memory controller.

17. The computing device of claim 9, wherein the processor is configured with processor-executable instructions to determine the period of time to force the memory subsystem into the low power mode based on at leastone or more of an average bandwidth demand of the memory subsystem, an input queue length of the memory subsystem, memory utilization during active power modes of the memory subsystem, quality of service requirements, and stall cycles of one or more components accessing the memory subsystem.

18. A non-transitory computer readable storage medium having stored thereon processor-executable software instructions configured to cause a processor of a computing device to perform operations comprising:
setting a memory subsystem to an active power mode;
determining a period of time to force the memory subsystem into a low power mode by using open loop control based on a determined actual frequency of the memory subsystem and a frequency determined by a dynamic clock and voltage scaling (DCVS) unit;
determining an amount of power saved by the memory subsystem in the low power mode for the determined period of time;
determining an amount of power the memory subsystem consumes entering and exiting the low power mode;
forcing the memory subsystem into the low power mode for the determined period of time in response to determining that the amount of power saved by the memory subsystem in the low power mode for the determined period of time is greater than the amount of power consumed by the memory subsystem entering and exiting the low power mode; and
inhibiting memory access requests such that the memory subsystem is prevented from executing any memory access requests during the low power mode.

19. The non-transitory computer readable medium of claim 18, wherein the stored processor-executable software instructions are configured to cause the processor to perform operations such that setting the memory subsystem to the active power mode comprises sending an enable signal to close a switch.

20. The non-transitory computer readable medium of claim 19, wherein the stored processor-executable software instructions are configured to cause the processor to perform operations such that:
sending the enable signal to close the switch comprises setting the enable signal to a high value, and
forcing the memory subsystem into the low power mode comprises setting the enable signal to a low value for the determined period of time.

21. The non-transitory computer readable medium of claim 19, wherein the switch is implemented in software.

22. The non-transitory computer readable medium of claim 21, wherein the switch is a flag that indicates whether memory access requests are to be processed by a memory controller.

23. The non-transitory computer readable medium of claim 18, wherein the stored processor-executable software instructions are configured to cause the processor to perform further operations comprising:
receiving a plurality of memory access requests while the memory subsystem is operating in the low power mode; and
sending, to the memory subsystem, the plurality of memory access requests received while the memory subsystem is operating in the low power mode.

24. The non-transitory computer readable medium of claim 23, wherein the stored processor-executable software instructions are configured to cause the processor to perform operations such that sending the plurality of memory access requests received while the memory subsystem is in the low power mode comprises:
sending, to a memory controller, each of the plurality of memory access requests in response to receiving each of the plurality of memory access requests while the memory system is operating in the low power mode, and
wherein the memory controller is configured to send the plurality of memory access requests to the memory of the memory subsystem in response to the memory subsystem being set to the active power mode.

25. The non-transitory computer readable medium of claim 18, wherein the determined period of time is based on one or more of an average bandwidth demand of the memory subsystem, an input queue length of the memory subsystem, memory utilization during active power modes of the memory subsystem, quality of service requirements, and stall cycles of one or more components accessing the memory subsystem.

26. A computing device, comprising:
means for setting a memory subsystem to operate in an active power mode;
means for determining a period of time to force the memory subsystem into a low power mode by using open loop control, wherein the means for determining the period of time to force the memory subsystem into a low power mode by using open loop control comprises means for determining an actual frequency of the memory subsystem and a dynamic clock and voltage scaling (DCVS) unit;
means for determining an amount of power saved by the memory subsystem in the low power mode for the determined period of time;
means for determining an amount of power the memory subsystem consumes entering and exiting the low power mode;
means for forcing the memory subsystem into the low power mode for the determined period of time in response to determining that the amount of power saved by the memory subsystem in the low power mode for the determined period is greater than the amount of power consumed by the memory subsystem entering and exiting the low power mode; and
means for inhibiting memory access requests such that the memory subsystem is prevented from executing any memory access requests during the low power mode.

27. The computing device of claim 26,
wherein the means for setting the memory subsystem to operate in the active power mode comprises means for sending an enable signal at a high value; and
wherein the means for forcing the memory subsystem into the low power mode for the determined period of time comprises means for sending the enable signal at a low value.

28. The computing device of claim 26, further comprising:
means for receiving a plurality of memory access requests while the memory subsystem is operating in the low power mode; and
means for sending, to the memory subsystem, the plurality of memory access requests received while the memory subsystem is operating in the low power mode.

29. The computing device of claim 26, wherein the means for determining the period of time to force the memory subsystem into the low power mode uses one or more of an average bandwidth demand of the memory subsystem, an input queue length of the memory subsystem, memory utilization during active power modes of the memory subsystem, quality of service requirements, and stall cycles of one or more components accessing the memory subsystem to calculate the period of time in which to force the memory subsystem to operate in the low power mode.

30. The computing device of claim 26, wherein the means for inhibiting the memory access requests comprises a flag that indicates whether memory access requests are to be processed by a memory controller.

* * * * *